United States Patent [19]
Williams

[11] Patent Number: 4,806,183
[45] Date of Patent: Feb. 21, 1989

[54] METHOD OF AND APPARATUS FOR CONTROLLING APPLICATION OF GLUE TO DEFINED AREAS

[75] Inventor: Donald H. Williams, Adams, Wis.

[73] Assignee: Consolidated Papers, Inc., Wisconsin Rapids, Wis.

[21] Appl. No.: 98,401

[22] Filed: Sep. 18, 1987

Related U.S. Application Data

[63] Continuation-in-part of Ser. No. 895,280, Aug. 11, 1986, abandoned.

[51] Int. Cl.[4] .......................... B05C 11/00; B32B 31/08
[52] U.S. Cl. ........................................ 156/64; 156/205; 156/356; 156/361; 156/378; 156/324; 156/470; 118/674; 118/679; 118/680; 118/672
[58] Field of Search ................. 156/64, 205, 356, 361, 156/378, 470, 357, 324; 118/674, 679, 680, 258, 261, 672, 220; 425/141

[56] References Cited

U.S. PATENT DOCUMENTS

| | | | |
|---|---|---|---|
| 2,330,530 | 9/1943 | Tuttle | 118/220 |
| 2,482,627 | 9/1949 | Langston | 156/367 |
| 2,674,222 | 4/1954 | Messinger et al. | 118/672 |
| 2,827,873 | 3/1958 | Thorn | 156/470 X |
| 3,127,292 | 3/1964 | Early | 156/361 X |
| 3,411,388 | 11/1968 | Rappaport | 156/64 X |
| 3,520,276 | 7/1970 | Martin | 118/674 |
| 3,930,774 | 1/1976 | Brand et al. | 425/141 |
| 4,026,237 | 5/1977 | Flanagan | 118/5 |
| 4,051,277 | 9/1977 | Wilkinson et al. | 156/210 X |
| 4,316,428 | 2/1982 | Flaum et al. | |
| 4,316,755 | 2/1982 | Flaum et al. | 156/205 |
| 4,360,538 | 11/1982 | Craemer et al. | 118/672 X |
| 4,369,080 | 1/1983 | Johnson | 156/350 X |
| 4,380,967 | 4/1983 | Matt | 118/669 |
| 4,389,969 | 6/1983 | Johnson | 118/665 |
| 4,389,971 | 6/1983 | Schmidt | 118/669 |
| 4,419,173 | 12/1983 | Akiyama et al. | 156/470 |
| 4,491,490 | 1/1985 | Ehret et al. | 156/64 |
| 4,561,918 | 12/1985 | Scharfenberg et al. | 156/292 X |
| 4,589,944 | 5/1986 | Torti et al. | 156/359 |
| 4,617,067 | 10/1986 | Jones, Jr. et al. | |

Primary Examiner—Michael W. Ball
Assistant Examiner—Jeff H. Aftergut
Attorney, Agent, or Firm—Juettner Pyle Lloyd & Verbeck

[57] ABSTRACT

Apparatus for applying adhesive onto flutes of single facers of corrugated media, so that the single facers may be adhered together and to a facing to form a composite web, comprises a plurality of adhesive applicator rolls, each for applying adhesive to the flutes of an associated one of the single facers. The actual speed of travel of the single facers passing across the applicator roll peripheries is sensed, and the rate of rotation of each roll is independently and accurately controlled, in accordance with the sensed speed, to apply a desired amount of adhesive onto selected areas of the flutes. The independent accurate control over applicator roll speeds enables minimum amounts of adhesive to be applied onto the flutes of the individual single spacers, as determined by their configurations and consistencies, while still ensuring proper adhesive of the single facers one to the other ad to the facing. Applying minimum amounts of adhesive onto the flutes reduces both the amount of adhesive required and moisture added to the single facers, so less heat is required to set the adhesive. In addition, minimizing moisture added to the single facers substantially eliminates warping of the composite web and "ribbing" on its outer surfaces, so the surfaces are very smooth and very high quality printing and graphics may be applied onto the surfaces.

24 Claims, 1 Drawing Sheet

METHOD OF AND APPARATUS FOR CONTROLLING APPLICATION OF GLUE TO DEFINED AREAS

BACKGROUND OF THE INVENTION

This application is a continuation-in-part of application Ser. No. 895,280, filed Aug. 11, 1986, now abandoned.

The present invention relates to a method of and apparatus for applying adhesive onto webs of sheet material so that the webs may be adhered together, and in particular to such a method and apparatus in which the amount and location of adhesive applied onto flutes of single facers is very accurately controlled.

Prior machines for applying adhesive onto the flutes of a plurality of single facers of corrugated cardboard media, so that the single facers may be adhered in overlying relationship and to a facing to form a sheet of cardboard, use applicator rolls for applying adhesive onto the flutes, and one or more belts at a combiner bring the single facers into overlying and adhering relationship and pull the single facers across the applicator rolls and through the machine. The combiner belts are supported on and moved by drums, and the applicator rolls are normally driven by means of a direct drive between one of the drums and the rolls. Usually, one drum carries a sprocket connected by a chain to an input sprocket to a distributor, and sprockets carried by individual applicator rolls are connected by chains to an output sprocket from the distributor. Rotation of the combiner drum therefore rotates the applicator rolls, and the arrangement is such that a predetermined fixed mechanical relationship exists between the speeds of rotation of the applicator rolls and that of the drum.

A disadvantage of prior adhesive applying machines is that the ratio between the speed of rotation of the combiner drum and the speeds of rotation of the applicator rolls cannot readily be changed. Because of the direct drive between the drum and rolls via chains and sprockets, to change the ratio of the speeds requires the tedious procedure of changing the distributor input sprocket. However, changing the distributor input sprocket only serves to change the ratio of the speed between the drum and each roll by the same amount. It does not change the ratio of the speeds between the drum and individual ones of the rolls by selected amounts, since that may be accomplished only by also changing the sprockets on the rolls, and as applicator roll sprockets cannot readily be replaced, prior practice does not contemplate that they be changed. Instead, once selected the applicator roll sprockets are normally not changed except as may be required for replacement due to wear, and they usually are selected so that irrespective of the speed of rotation of the combiner drum, all of the applicator roll peripheries move at the same speed, so changing the distributor input sprocket only serves to uniformly change the speed of each applicator roll periphery.

The rationale behind rotating the applicator rolls by a direct drive between the rolls and a combiner belt drum is to obtain a direct correlation between the peripheral speeds of the rolls and the speed of travel of the single facers as they are pulled across the rolls. The single facers are pulled across the roll peripheries by the combiner belts, which ride on and are moved by the combiner drum, so it is assumed that, ideally, a known and direct relationship exists between the speed of travel of the single facers and the speed of rotation of the drum and, therefore, between the speed of the single facers and the speeds of the roll peripheries. However, the assumption ignores, and the technique cannot account for, slippage that occurs in practice between the belts on the drum and the single facers on the belts. Usually, the distributor input sprocket is selected to obtain a predetermined relationship between single facer and applicator roll peripheral speeds, such that the roll peripheries move slightly slower than the single facers to obtain a wiping action across the flutes, but because of slippage the relationship is impossible to maintain.

Because of the inability with prior machines to accurately control the speeds of the applicator roll peripheries with respect to the speed of travel of single facers moved across the peripheries, and to independently and accurately control the single facer/roll periphery speed relationship for each applicator roll to compensate for variations in flute configurations and consistencies, according to conventional practice an excess of adhesive is applied onto the flutes to ensure proper adhesion of the single facers one to the other despite misplacement of adhesive on the flutes as a result of variations in the speed relationship. This is accomplished by using applicator rolls that have either smooth or cellular peripheral surfaces, and by using a metering roll to doctor adhesive picked up by the applicator rolls in a manner to leave a film of adhesive of selected thickness on the peripheries for transfer to the single facer flutes. However, water comprises a substantial portion of the adhesive, and in addition to wasting adhesive, a consequence of transferring excess adhesive to the flutes is that the flutes are excessively moistened. The adhesive must be dried in the combiner to adhere the single facers together, so the more moisture that is applied onto the flutes, the greater the heat energy requirements to set the adhesive. More importantly, excessively moistening the flutes results in warping of the resulting cardboard material and "ribbing" on its outer facing or surface, which often makes it very difficult if not impossible to apply high quality printing or graphics onto the surface.

OBJECT OF THE INVENTION

An object of the present invention is to provide an improved apparatus for and method of applying adhesive onto the flutes of a plurality of single facers of corrugated media, where the actual speed of travel of the single facers through the apparatus is directly sensed and used to independently control the rate of rotation of individual ones of a plurality of adhesive applicator rolls to control the amount of location of adhesive transferred onto the flutes.

Another object is to provide such an apparatus and method, in which the sensed speed of travel of the single facers is used to variably and independently control the speed of rotation of each applicator roll in order to selectively apply more or less adhesive onto the tips, the leading edges or the trailing edges of the flutes of individual ones of the single facers.

A further object is to provide such an apparatus and method, wherein control over applicator roll speeds of rotation with respect to web travel speed significantly reduces the amount of adhesive required to properly adhere the single facers one to the other.

Yet another object is to provide such an apparatus and method wherein, by virtue of the reduction in the amount of adhesive and therefore moisture applied onto the flutes, warping of the resulting cardboard and "ribbing" on its smooth outer surface are substantially eliminated.

Still another object is to provide such an apparatus and method, in which the sizes of nips between the applicator rolls and associated weight rolls, through which the single facers pass, is automatically sensed and controlled.

SUMMARY OF THE INVENTION

In accordance with the present invention, apparatus for applying adhesive onto the flutes of a plurality of corrugated webs comprises a plurality of adhesive applicator rolls; means for transferring adhesive to peripheries of the applicator roll; means for moving the webs in unison and at the same speed of travel so that each web moves across the periphery of an associated one of the applicator rolls with its flutes against the periphery for a transfer of adhesive from the periphery to the flutes; and means for sensing the actual speed of travel of the webs. Also included are means responsive to the sensed actual speed of travel of the webs for independently rotating each applicator roll at a rate varied as necessary to mainain constant an individually selected relationship between the peripheral speed of the roll and the speed of travel of its associated web, despite any variations in the speed of travel of the webs, to thereby control the amount and location of adhesive applied onto the flutes of individual ones of the webs.

In a preferred embodiment of the apparatus, the means for rotating individually rotates each applicator roll so that, depending upon the selected relationship between its peripheral speed and the speed of travel of its associated web, its peripheral speed is the same as, a predetermined amount less than, or a predetermined amount greater than the speed of travel of the web, and included is means for bringing together the adhesive carrying webs into overlying and adhering relationship to form a composite sheet of material. In addition, each applicator roll has cells in its peripheral surface, the means for transferring adhesive to the applicator roll peripheries fills the cells with adhesive and, after adhesive is transferred to the peripheries, a doctor means removes substantially all of the adhesive from the peripheries except for that in the cells, so only the limited amount of adhesive in the cells is transferred to the web flutes. Because only a limited amount of adhesive is transferred to the flutes, adhesive consumption is reduced and moistening of the flutes is minimized, so that warping of the composite sheet and "ribbing" on its surfaces are substantially eliminated.

A plurality of rotatable weight rolls are associated with individual ones of the applicator rolls, and define with the applicator rolls nips through which the associated webs pass. The apparatus contemplates means for automatically adjusting the sizes of the nips, and the means for adjusting includes means for detecting the sizes of the nips, means for comparing the detected nip sizes with peselected desired sizes, and means responsive to the comparison for moving the weight and applicator rolls relative to each other to bring the nips to the desired sizes.

The invention also contemplates a method of applying adhesive onto the flutes of a plurality of corrugated webs, which includes the steps of transferring adhesive to the peripheries of a plurality of applicator rolls; moving the webs in unison and at the same speed of travel so that each web moves across the periphery of an associated one of the applicator rolls with its flutes against the periphery for a transfer of adhesive from the periphery to the flutes; and sensing the actual speed of travel of the webs. Also included is the step of independently rotating each applicator roll, in accordance with the sensed actual speed of the webs, at a rate varied as necessary to maintain constant an individually selected relationship between the peripheral speed of each applicator roll and the speed of travel of its associated web, despite any variations in the speed of travel and of the webs, to thereby control the amount and location of adhesive applied onto the flutes of individual ones of the webs.

In a preferred practice of the method, also included is the step of bringing together the adhesive carrying webs into overlying and adhering relationship to form a composite sheet of material. Each applicator roll has cells in its peripheral surface, and the step of transferring adhesive to the applicator roll peripheries fills the cells with adhesive, and further included is the step of doctoring substantially all of the adhesive off of the applicator roll peripheries except for that in the cells, so that only the limited amount of adhesive in the cells is transferred to the flutes of the webs. By virtue of transferring only a limited amount of adhesive to the flutes, adhesive consumption is reduced and moistening of the webs is minimized, so that warping of the composite sheet and "ribbing" on its surfaces are substantially eliminated.

The foregoing and other objects, advantages and features of the invention will become apparent upon a consideration of the following detailed description, when taken in conjunction with the accompanying drawings.

DETAILED DESCRIPTION

Figure 1:
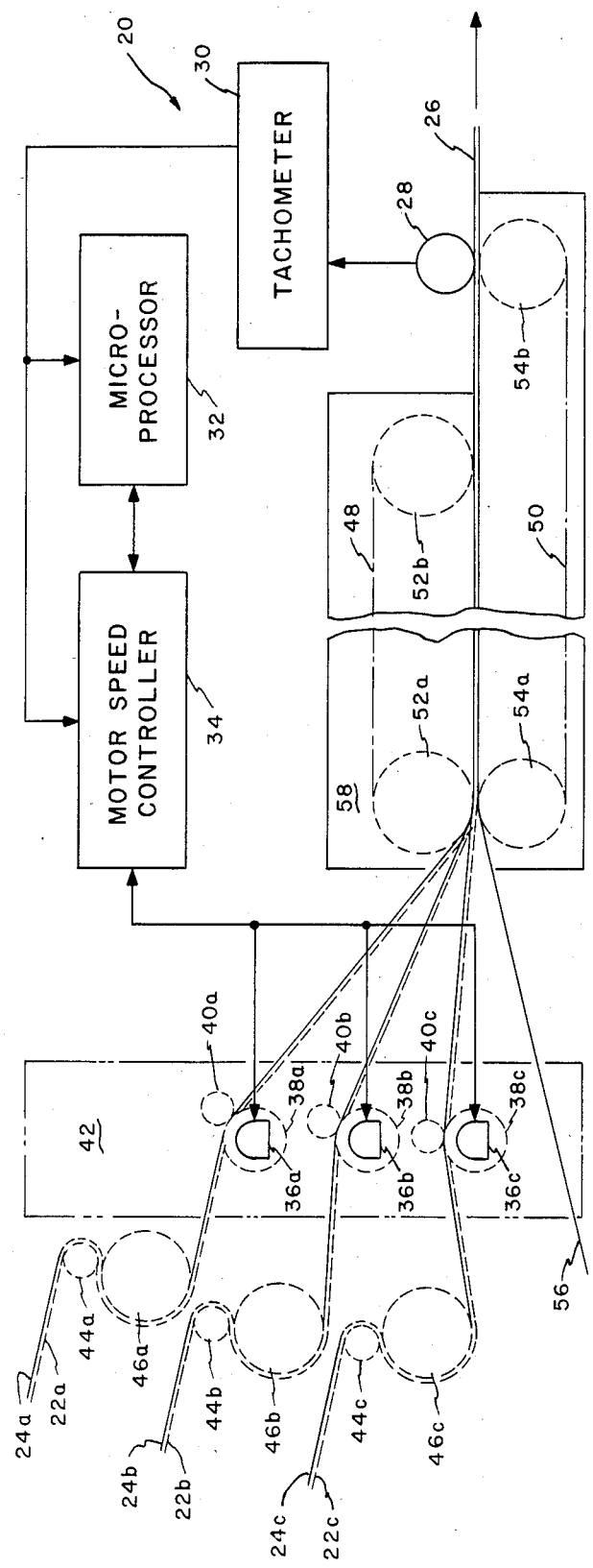
FIG. 1 is a schematic side view of an adhesive applying apparatus for single facers of corrugated cardboard media, embodying the teachings of the present invention.

FIG. 1 illustrates an apparatus, indicated generally at 20, for applying adhesive or glue onto flutes 22a–c of single facers or corrugated webs 24a–c of cardboard media, and for placing the single facers and a facing in overlying relationship so that the same are adhered one to the other to form a composite cardboard sheet 26. The actual speed of travel of the cardboard sheet, and therefore of the single facers, is continuously directly sensed or monitored by means of a friction wheel 28 riding on an upper surface of the sheet. The wheel is coupled to a tachometer 30 that generates a signal having a value in accordance with sensed web speed and applies the signal to both a programmable microprocessor 32 and a motor speed controller 34. The motor speed controller and microprocessor are interconnected, and the motor speed controller is coupled to a plurality of d.c. motors 36a–c, each of which rotates a respective one of a plurality of engraved or cellular surfaced adhesive applicator rolls 38a–c. Associated and defining nips with the applicator rolls are respective weight rolls 40a–c, and the electric motors, along with the applicator and weight rolls, are at an adhesive applying station 42.

The single facers 24a-c extend from supplies thereof (not shown) around associated guide rolls 44a-c and 46a-c, and from the guide rolls to and through nips between respective applicator rolls 38a-c and weight rolls 40a-c. The single facer flutes 22a-c contact the applicator roll peripheral surfaces as they pass through the nips, whereby the applicator rolls apply adhesive onto the flutes. From the applicator rolls, the single facers extend to and come together in overlying relationship between a pair of endless belts 48 and 50 of a combiner. The belt 48 extends around and is carried by a pair of drums 52a and 52b, the belt 50 extends around and is carried by a pair of drums 54a and 54b, and although not shown, means are provided for rotating the drums at a selected speed to move the belts. The belts define a conveyor means for the single facers 24a-c, and pull the single facers through the apparatus and across the applicator rolls. Also extending between the belts and beneath the lowermost single facer 24c is a paper sheet medium or facing 56 obtained from a supply thereof (not shown). In this manner, the single facers and facing are brought into overlying relationship and carried by the belts through a dryer station 58 at the combiner to set the adhesive and form the composite cardboard sheet or triple facer 26.

The amount and location of adhesive applied onto the flutes 22a-c depends upon the speed of travel of the single facers relative to the peripheral speeds of their associated applicator rolls 38a-c. If the speed of the single facers equals the peripheral speeds of the applicator rolls, adhesive will be applied primarily onto the flute tips. If the peripheral speeds of the applicator rolls is slower or faster than single facer speed, there will be a wiping action of the flutes across the applicator rolls and more or less adhesive will be applied onto the leading or trailing edges of the flutes.

According to conventional practice, in an attempt to control the speeds of the applicator roll peripheries relative to the speed of travel of the single facers 12a-c, the assumption would be made that since the combiner belts 48 and 50 pull the single facers through the machine, the speed of the single facers is the same as that of the belts. The assumption would also be made that since the belts travel on the drums 52a-b and 54a-b, the rate of rotation of the drums directly correlates to the speed of travel of the belts. Conventional practice would therefore contemplate connecting a sprocket on one of the drums to an input sprocket to a distributor by means of a chain, and then connecting an output sprocket from the distributor, by means of additional chains, to sprockets carried on each applicator roll 38a-c. The particular sprocket at the distributor input would determine the speed of rotation of the applicator rolls relative to that of the drum and, ideally, the peripheral speeds of the applicator rolls relative to the speed of travel of the single facers. However, in practice the combiner belts slip on the drums, and the single facers slip with respect to the combiner belts, so variations would occur in the speed of travel of the single facers with respect to the speeds of the applicator roll peripheries and, therefore, in the amount and location of glue applied onto the flutes.

In addition, according to conventional practice, the speeds of rotation of the applicator rolls would be identical. Consequently, even if the speed of travel of the single facers relative to the peripheral speeds of the applicator rolls could be maintained constant, because the applicator rolls cannot be rotated at different speeds relative to each other, compensation in adhesive application cannot be made to account for different configurations of flutes or differences in the consistencies of the individual single facers. Therefore, to ensure that the single facers will be properly adhered one to the other despite variations in adhesive application and despite the inability to control adhesive application in accordance with flute configuration and consistency, the prior art also contemplates that an excess of adhesive be applied onto the flutes. However, the major component of the adhesive is water, which must be evaporated in the dryer station 58 to set the adhesive, so applying excess adhesive to the flutes wastes adhesive and increases dryer energy requirements. More importantly, and of greater disadvantage, the excess moisture applied to the flutes via the adhesive results in warping of the resulting cardboard sheet 26 and causes "ribbing" on the outer surfaces of the sheet. Consequently, instead of being smooth, the surfaces of the cardboard sheet will tend to conform to the underlying flutes, so that it will be difficult if not impossible to then apply high quality printing or graphics on the sheet.

In overcoming the disadvantages of prior adhesive applying machines, in accordance with the present invention, each applicator roll is independently rotated at a rate controlled so that its peripheral speed is always maintained in an individually preselected relationship to the actual speed of travel of the single facer carried across its periphery. This is accomplished by having the friction wheel 28 of the tachometer 30 ride on the surface of the triple facer cardboard sheet 26 at or as it leaves the combiner. The actual speed of travel of the single facers is therefore continuously sensed or monitored, and the tachometer generates and applies to the microprocessor 32 and motor speed controller 34 a signal having a value in accordance with single facer speed. The motor speed controller, in addition to controlling the speeds of operation of the motors 36a-c, receives from at least one of the motors, for example the motor 36b, a signal having a value representative of the speed of operation of the motor, and therefore of the peripheral speed of the adhesive applicator roll 38b, and couples that signal to the microprocessor. The microprocessor compares the signals representative of single facer and motor speed, and based upon the comparison, and depending upon whether the microprocessor has been programmed so that adhesive is applied primarily to the flute tips, or more so to the leading or trailing edges of the flutes, of individual ones of the single facers, the microprocessor applies to the motor speed controller signals that cause the controller to independently operate each motor 36a-c at an individually controlled speed, so that the peripheral speed of each applicator roll is independently maintained equal to, greater than or less than the speed of the single facer carried across its periphery. For the situation described, the motors 36a and 36c are referred to the motor 36b, and are independently operated at individually controlled speeds that have a predetermined relationship to the sensed speed of the motor 36b. However, the motor speed controller may just as readily receive from each motor a signal representative of its speed, and couple those signals to the microprocessor, so that the microprocessor then controls each motor so that its actual speed is equal to a desired speed. Since the diameters of the applicator rolls are known and usually identical, the arrangement enables the rate of rotation of each roll to be independently, accurately and variably controlled, such that a predetermined relationship or ratio is maintained between its peripheral speed and the actual speed of travel of the single facer across its periphery.

The apparatus therefore enables precise control to be maintained over the amount and location of adhesive applied onto single facer flutes, by independently controlling the speed of rotation of each individual applicator roll in accordance with the sensed actual speed of travel of the single facer carried across its periphery, so that selected relationships are always maintained between the speed of the single facers and the peripheral speeds of their associated applicator rolls, despite variations in the speed of the single facers. Each applicator roll may be selectively rotated at rates to apply adhesive to primarily the flute tips of its associated single facer, or to get a wiping action of the roll periphery across the flutes to apply more or less adhesive to either leading or lagging edges of the flutes. Since the amount and location of adhesive that must be applied onto the flutes, for proper adhesion of the single facers, varies in accordance with flute size and shape and with the consistency of the material of the single facers, and since the ammount and location will vary with changes in the speed relationships between the single facers and their associated applicator roll peripheries, the apparatus advantageously compensates for and eliminates the negative influence of such variables. In consequence of the precise control over application of adhesive, and as will be further described, as compared with conventional applicators, adhesive consumption is reduced by about fifty percent, and the resulting cardboard product is not warped and has very smooth outer surfaces onto which may be imprinted high quality graphics.

The single facers pass through nips defined between the adhesive applicator rolls 38a–c and weight rolls 40a–c, which must be adjusted to and maintained at selected sizes, in accordance with the thicknesses and types of the single facers, for proper application of adhesive onto the flutes without crushing the flutes. The art contemplates manual adjustment of nip size, but the procedure is generally time intensive and inaccurate, and must be repeated for different types of single facers.

Figure 2:
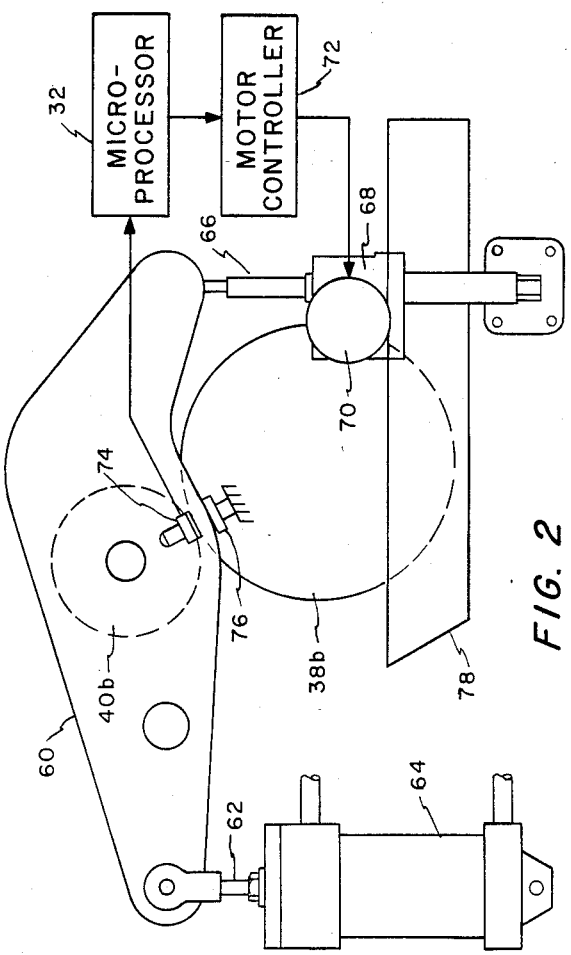
FIG. 2 is a side view of structure for supporting a weight roll and controlling the size of a nip between the weight roll and an associated adhesive applicator roll.

Accordingly, in further improving upon the art, the invention also contemplates automatic adjustment of the nips between the adhesive applicators rolls 38a–c and weight rolls 40a–c. With reference to FIG. 2, which illustrates an arrangement for adjusting the size of the nip between the applicator roll 38b and weight roll 40b, it being understood that a similar structure is provided for each set of applicator and weight rolls, each end of the weight roll 40b is journaled for rotation in an arm 60. One end of the arm connects to a piston rod 62 of a pneumatic cylinder 64 that is operable to either extend the piston rod and move the weight roll away from the applicator roll or retract the piston rod and preload the weight roll toward the applicator roll. An opposite end of the weight roll arm rests on an extension of a screw actuator 66 coupled through a gearbox 68 to a stepping motor 70. The stepping motor is operated by a motor controller 72 to either raise or lower the screw actuator, and the motor controller is controlled by the microprocessor 32. Carried on the arm for movement therewith is a displacement transducer 74 that applies to the microprocessor a signal having a value representative of the distance between it and a target 66 mounted on the apparatus at a known position with respect to the applicator roll, and therefore of the size of the nip.

The signal factor 24b passes through the nip between the weight roll 40b and the applicator roll 38b for having adhesive, picked up by the applicator roll periphery from an adhesive pan 78, applied onto the flutes 22b as they are carried across the periphery. To adjust the nip size, the displacement transducer 74 sends to the microprocessor 32 a signal representative of the size of the nip. The microprocessor compares the signal representing nip size with a preprogrammed desired nip size, and if the nip is smaller or larger than desired, causes the motor controller 72 to operate the stepping motor 70 to drive the screw actuator 66 either up to down to move the weight roll away from or toward the applicator roll, until the nip has the desired size. During application of adhesive onto the flutes, the piston rod 62 is fully retracted, so nip size is determined solely by the amount of extension of the screw actuator 66, although for convenience in threading the single facer through the nip, the piston rod is extendible to move the weight roll away from the applicator roll and substantially widen the nip.

Adhesive picked up by the applicator rolls 38a–c from associated adhesive pans 78 is metered prior to being transferred to the single facer flutes. Previously, metering was accomplished by running a doctor roll against the applicator roll periphery, in a manner such that a discrete film of adhesive was left on the periphery, even when the periphery was engraved or cellular, i.e., provided with discrete adhesive carrying pockets. Because of the inability of prior apparatus to accurately control applicator roll peripheral speed relative to that of the single facer carried across it, it was necessary to leave a film of adhesive on the roll periphery so that an excess of adhesive would be transferred to the flutes to ensure proper adhesion between the single facers. However, a major component of the adhesive is water, so by transferring excess adhesive to the flutes, excess moisture was also transferred, which resulted in warping of the resulting cardboard sheet and a "ribbing" effect on its outer surfaces, along with waste of adhesive and increased energy requirements for drying and setting the adhesive.

Figure 3:
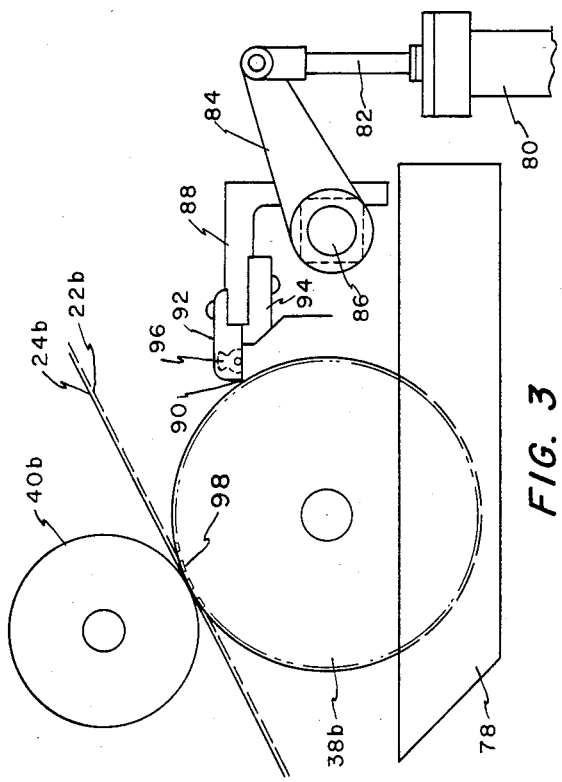
FIG. 3 is a side view of a doctor assembly for metering adhesive on an applicator roll.

The invention therefore also contemplates an improved doctor for metering adhesive on the applicator roll peripheries. As seen in FIG. 3, associated with each applicator roll, such as the roll 38b, is a doctor blade assembly comprising an air cylinder 80 having a piston rod 82 connected to one end of an arm 84, an opposite end of which is journaled at 86 for rotation. An L-shaped bracket 88, mounted toward one of its ends on the arm, carries at its opposite end a doctor blade 90 secured between a pair of plates 92 and 94. An inflatable tube 96 acts on the doctor blade and urges the blade tip toward and against the applicator roll periphery.

In operation of the doctor, the cylinder 80 is mounted so that when its piston rod 82 is extended and the tube 96 is inflated, the tip of the doctor blade 90 is moved against the applicator roll periphery to wipe the periphery substantially clean of adhesive, leaving behind only a limited amount of adhesive as carried in cellular peripheral pockets 98. Consequently, only the adhesive contained in the pockets is carried and available for transfer to the single facer flutes, so the amount of adhesive transferred to the flutes is limited. However, because of the precise control over the peripheral speed of the applicator roll relative to that of the single facer, the adhesive is very precisely placed at desired locations on the flutes, so proper adhesion of one single factor to another is obtained even with a minimum amount of adhesive. In practice, it has been found that the precise control provided by the invention over the applicator roll/single facer speed relationships enables proper adherence of the single facers one to the other with a reduction in adhesive consumption to about fifty percent of what would otherwise be conventionally required. The reduction in the amount of adhesive placed on the flutes proportionately reduces moisture transfer to the flutes, which substantially eliminates the warping and "ribbing" problems that otherwise occur in product made with conventional apparatus.

The invention therefore provides an improved apparatus for and method and applying adhesive onto the flutes of single facers that are adhered together and to a facing to form a cardboard sheet. After passing through a supply of adhesive, the periphery of each applicator roll is wiped substantially clean by a doctor, leaving behind only a limited amount of adhesive in the cellular peripheral pockets, for transfer to flutes of a single facer moved across the periphery. Normally, the quantity of glue transferred to the flutes would not be sufficient to ensure proper adherence of one single facer to another and to the facing. However, because of the precise control available over the speed of rotation of the applicator roll, and therefore over its peripheral speed, relative to the speed of travel of the single facer, the limited amount of adhesive is so precisely positioned on the flutes that secure adhesion of the single facers and facing sheet is ensured. As compared with conventional adhesive applying apparatus, the one of the invention provides a reduction in adhesive consumption on the order of about fifty percent.

In addition to the economies involved in reducing adhesive consumption, the reduction in the amount of adhesive applied to the flutes correspondingly reduces the amount of moisture added and, therefore, energy requirements for a drying process to set the adhesive. More importantly, since excessive moisture is a significant factor in causing warping of the resulting cardboard product and "ribbing" on its surfaces, the reduction in moisture transferred to the flutes substantially eliminates the problems of warping and "ribbing." The problem of "ribbing," i.e., the tendency of the facing on the outer surfaces of the cardboard sheet to conform to the underlying flutes, so that the surfaces are not smooth and flat, is particularly troublesome in the application of high quality printing and graphics onto the cardboard. By substantially eliminating "ribbing," the apparatus of the invention therefore enables high quality printing and graphics to be applied onto the cardboard.

Further, for a given thickness of a resulting cardboard sheet, when made into a carton its stacking strength is generally determined by the size of its flutes, such that the larger the flutes the greater its stacking strength. However, to increase the size of the flutes, while maintaining the cardboard sheet at a given thickness, requires decreasing the thickness of the outer facing, but that in turn aggravates the "ribbing" problem and causes it to become more pronounced. However, because of the limited amount of adhesive applied onto the flutes, flute size can be increased, with a corresponding decrease in thickness of the facing, while still maintaining a very smooth outer surface on the cardboard.

While embodiments of the invention have been described in detail, various modifications and other embodiments thereof may be devised by one skilled in the art without departing from the spirit and scope of the invention, as defined in the appended claims.

What is claimed is:

1. Apparatus for applying adhesive to flutes of a plurality of corrugated webs, comprising a plurality of adhesive applicator rolls; means for transferring adhesive to peripheries of said applicator rolls; means for moving the webs in unison and at the same speed of travel, such that each web moves across the periphery of an associated one of said applicator rolls with its flutes against said periphery for transfer of adhesive from said periphery to the flutes; means for continuously sensing the actual speed of travel of the webs; and means responsive to the sensed actual speed of travel of the webs for rotating each individual applicator roll at a rate of rotation that is independent of the rate of rotation of the other rolls and that is varied as necessary to maintain constant an individually selected and adjustable relationship between the peripheral speed of the roll and the sensed actual speed of travel of the webs, despite any variations in the sensed actual speed of travel of the webs, to thereby control the amount and location of adhesive applied onto the flutes of each individual one of the webs.

2. Apparatus as in claim 1, wherein said means for rotating rotates each said applicator roll independently so that, depending upon the selected relationship between its peripheral speed and the speed of travel of the webs, its peripheral speed is the same as, a predetermined amount less than or a predetermined amount greater than the speed of travel of the webs.

3. Apparatus as in claim 1, including means for doctoring adhesive transferred to each applicator roll periphery prior to transferring adhesive from the periphery to flutes of its associated web.

4. Apparatus as in claim 1, including meas for bringing together the adhesive carrying webs into overlying and adhering relationship to form a composite sheet of material, and wherein said sensing means senses the actual speed of travel of the composite sheet.

5. Apparatus as in claim 1, wherein said means for rotating includes a plurality of motor means, each for rotating an associated individual one of said applicator rolls, and means, coupled to said sensing means, for operating each said motor means to rotate each said applicator roll at a rate that is varied as necessary to maintain constant the individual selected and adjustable relationship between the peripheral speed of the applicator roll and the sensed actual speed of travel of the webs.

6. Apparatus as in claim 5, wherein each said motor means comprises electric motor means, and said means for operating each said motor means includes a motor speed controller for operating each said electric motor means and for sensing the speed of operation of at least one of said electric motor means, and a microprocessor coupled with said motor speed controller and said sensing means for comparing the sensed actual speed of travel of the webs and the speed of operation of said at least one electric motor means and for causing said motor speed controller to operate each said electric motor means such that the individually selected and adjustable relationships are maintained between said applicator roll peripheral speeds and the sensed speed of travel of the webs despite any variations in the sensed speed of travel of the webs.

7. Apparatus as in claim 4, wherein each said applicator roll has cells in its peripheral surface, said means for transferring adhesive to said applicator roll peripheries fills said cells with adhesive, and said doctor means removes substantially all of the adhesive off of said applicator roll peripheries except for adhesive in said cells, so that only the limited amount of adhesive in said cells is transferred to the flutes of the webs, whereby adhesive consumption is reduced and warping of the composite sheet and "ribbing" on its surfaces are substantially eliminated.

8. Apparatus for applying adhesive to flutes of a plurality of corrugated webs, comprising a plurality of adhesive applicator rolls; means for transferring adhesive to peripheries of said applicator rolls; means for moving the webs in unison and at the same speed of travel so that each web moves across the periphery of an associated one of said applicator rolls with its flutes against said periphery for transfer of adhesive from said periphery to the flutes; means for sensing the actual speed of travel of the webs; means responsive to the sensed actual speed of travel of the webs for independently rotating each applicator roll at a rate varied as necessary to maintain constant an individually selected relationship between the peripheral speed of the roll and the speed of travel of its associated web, despite any variations in the speed of travel of the webs, to thereby control the amount and location of adhesive applied onto the flutes of individual ones of the webs; a plurality of rotatable weight rolls, each associated with an individual one of said applicator rolls and defining with said applicator rolls nips through which their associated webs pass; and means for adjusting the sizes of said nips, said adjusting means including means for detecting the sizes of said nips, means for comparing detected nip sizes with preselected desired sizes and means, responsive to said comparison, for moving said weight and applicator rolls relative to each other to bring said nips to said desired sizes.

9. Apparatus for adhesively adhering a plurality of corrugated cardboard webs and a facing in overlying relationship to form a composite sheet of cardboard, comprising a plurality of rotatable adhesive applicator rolls, each having a periphery across which an individual associated one of the webs is extendible for transfer of adhesive from said periphery to flutes of the web; means for transferring adhesive to said applicator roll peripheries; conveyor means downstream of said applicator rolls for receiving the webs and facing, moving the same into overlying adhering relationship, and pulling the webs in unison and at the same speed of travel across said applicator roll peripheries for a transfer of adhesive from said peripheries to the web flutes; means for rotating each said applicator roll; means for continuously sensing the actual speed of travel of the webs; and means, responsive to the sensed actual speed of travel of the webs, for controlling said rotating means to rotate each said applicator roll at a rate of rotation that is independent of the rate of rotation of the other applicator rolls and that is varied as necessary to maintain constant an individually selected and adjustable relationship between the peripheral speed of the roll and the sensed actual speed of travel of the webs, despite any variations in the sensed actual speed of travel of the webs, to thereby control the amount and location of adhesive applied onto the flutes of each individual one of the webs.

10. Apparatus as in claim 9, wherein said controlling means controls said rotating means to rotate each said applicator roll at a rate such that, depending upon the selected and adjustable relationship between its peripheral speed and the sensed actual speed of travel of the webs, its peripheral speed is the same as, a predetermined amount less than, or a predetermined amount greater than the speed of travel of the webs.

11. Apparatus as in claim 9, including doctor means for doctoring adhesive transferred to each applicator roll periphery prior to transferring adhesive from said peripheries to flutes of the webs.

12. Apparatus as in claim 11, wherein each said applicator roll has cells in its peripheral surface, said means for transferring adhesive to said applicator roll peripheries fills said cells with adhesive, and said doctor means doctors substantially all of the adhesive off of said applicator roll peripheries except for adhesive in said cells, so that only the limited amount of adhesive in said cells is transferred to the flutes of the webs, whereby adhesive consumption is reduced and there is a reduction in moisture transferred to the flutes that substantially eliminates warping and "ribbing" on the surfaces of the composite cardboard sheet.

13. Apparatus as in claim 9, wherein said sensing means senses the actual speed of the webs at said conveyor means.

14. Apparatus as in claim 13, wherein said conveyor means comprises a pair of conveyor belts in overlapping relationship and the webs, after leaving said applicator rolls, move into overlying and adhering relationship with the facing between said belts and said belts pull the webs across their associated applicator roll peripheries, and said sensing means senses the actual speed of travel of the composite cardboard sheet exiting from between said belts, independent of the speed of travel of said belts.

15. Apparatus as in claim 9, wherein said means for rotating comprises a plurality of electric motor means, each for rotating a respective one of said applicator rolls, and said controlling means operates each said motor means to rotate each said applicator roll at a rate that is varied as necessary to maintain constant the individually selected and adjustable relationship between the peripheral speed of the applicator roll and the sensed actual speed of travel of the webs.

16. Apparatus as in claim 15, wherein said sensing means comprises a friction roll for riding on at least one of the webs and a tachometer coupled to said friction roll for generating a signal having a value representative of the speed of travel of the webs, and said means for controlling is responsive to the value of said signal for operating each said electric motor means.

17. Apparatus as in claim 15, wherein said means for sensing generates a first signal having a value representative of the actual speed of trael of the webs, and said means for controlling comprises a programmable microprocessor and a motor speed controller for receiving said first signal, said motor speed controller is coupled with said microprocessor and with each of said electric motor means for controlling operation of each said motor means and for receiving from at least one of said motor means a second signal having a value representative of the speed of operation thereof, said motor speed controller coupling said second signal to said microprocessor and said microprocessor comparing said first and second signals and causing said motor speed controller to operate each said electric motor means such that the selected and adjustable relationships are maintained between each said applicator roll peripheral speed and the sensed actual speed of travel of the webs, despite any variations in the speed of travel of the webs.

18. Apparatus for adhesively adhering a plurality of corrugated cardboard webs and a facing in overlying relationship to form a composite sheet of cardboard, comprising a plurality of rotatable adhesive applicator rolls, each having a periphery across which an individual one of the webs is extendible for transfer of adhesive from said periphery to flutes of the web; means for transferring adhesive to said applicator roll peripheries; conveyor means downstream of said applicator rolls for receiving the webs and facing, moving the same into overlying adhering relationship, and pulling the webs across said applicator roll peripheries for a transfer of adhesive from said peripheries to the web flutes; means for independently rotating each said applicator roll; means for sensing the actual speed of travel of the webs; means, responsive to the sensed actual speed of travel of the webs, for controlling said rotating means to independently rotate each said applicator roll at a rate varied as necessary to maintain constant an individually selected relationship between the peripheral speed of the roll and the speed of travel of its associated web, despite any variation in the speed of travel of the webs, to thereby control the amount and location of adhesive applied onto the flutes of individual ones of the webs; a plurality of rotatably weight rolls, each associated with an individual one of said applicator rolls and defining with said applicator rolls nips through which their associated webs pass in extending across said applicator roll peripheries; and means for adjusting the sizes of said nips, said adjusting means including means for detecting the sizes of said nips, means for comparing detected nip sizes with preselected desired sizes and means, responsive to said comparison, for moving said weight and applicator rolls relative to each other to bring said nips to said desired sizes.

19. A method of applying adhesive to flutes of a plurality of corrugated webs, comprising the steps of transferring adhesive to peripheries of a plurality of applicator rolls; moving the webs in unison and at the same speed of travel, such that each web moves across the periphery of an associated one of the applicator rolls with its flutes against the periphery to transfer adhesive from the periphery to the flutes; continuously sensing the actual speed of travel of the webs; and rotating each applicator roll, in accordance with the sensed actual speed of travel of the webs, at a rate of rotation that is independent of the rate of rotation of the other applicator rolls and that is varied as necessary to maintain constant an individually selected and adjustable relationship between the peripheral speed of the roll and the sensed actual speed of travel of the webs, despite any variations in the sensed actual speed of travel of the webs, to thereby control the amount and location of adhesive applied onto the flutes of each individual one of the webs.

20. A method as in claim 19, wherein said rotating step comprises individually rotating each applicator roll so that, depending upon the selected relationship between its peripheral speed and the speed of travel of the webs, its peripheral speed is the same as, a predetermined amount less than, or a predetermined amount greater than the speed of travel of the webs.

21. A method as in claim 19, including the step of doctoring adhesive transferred to each applicator roll periphery prior to transferring adhesive from the periphery to flutes of its associated web.

22. A method as in claim 21, including the step of bringing together the adhesive carrying webs into overlying and adhering relationship to from a composite sheet of material.

23. A method as in claim 22, wherein each applicator roll has cells in its peripheral surface, said step of transferring adhesive to the applicator roll peripheries fills the cells with adhesive, and said doctoring step removes substantially all of the adhesive off of the applicator roll peripheries except for adhesive in the cells, so that only the limited amount of adhesive in the cells is transferred to the flutes of the webs, whereby adhesive consumption is reduced and warping of the composite sheet and "ribbing" on its surfaces are substantially eliminated.

24. A method of applying adhesive to flutes of a plurality of corrugated webs, comprising the steps of transferring adhesive to peripheries of a plurality of applicator rolls; moving the webs in unison and at the same speed of travel such that each web moves across the periphery of a associated one of the applicator rolls with its flutes against the periphery to transfer adhesive from the periphery to the flutes; sensing the actual speed of travel of the webs; and independently rotating each applicator roll, in accordance with the sensed actual speed of travel of the webs, at a rate varied as necessary to maintain constant an individually selected relationship between the peripheral speed of each roll and the speed of travel of its associated web, despite any variations in the speed of travel of the webs, to thereby control the amount and location of adhesive applied onto the flutes of individual ones of the webs, wherein a plurality of rotatably weight rolls are each associated with an individual one of the applicator rolls and define with the applicator rolls nips through which their associated webs pass, and including the further steps of detecting the sizes of the nips; comparing the detected nip sizes with preselected desired sizes; and, based upon said comparison step, moving the weight and applicator rolls relative to each other to bring the nips to the desired sizes.

* * * * *